United States Patent
Arar et al.

(10) Patent No.: US 6,513,317 B2
(45) Date of Patent: Feb. 4, 2003

(54) APPARATUS FOR CONTROLLING NITROGEN INJECTION INTO GAS TURBINE

(75) Inventors: Malath Ibrahim Arar, Clifton Park, NY (US); Jonathon Michael Hadley, Oneonta, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/758,718

(22) Filed: Jan. 11, 2001

(65) Prior Publication Data

US 2002/0088236 A1 Jul. 11, 2002

(51) Int. Cl.[7] ................................. F02C 3/28
(52) U.S. Cl. .................... 60/39.12; 60/39.182
(58) Field of Search ...................... 60/39.12, 39.182

(56) References Cited

U.S. PATENT DOCUMENTS 4,729,217 A * 3/1988 Kehlhofer .................. 60/39.12
4,976,101 A * 12/1990 Schiffers ................... 60/39.12
5,410,869 A * 5/1995 Muller ...................... 60/39.12
5,697,207 A 12/1997 Cromer et al.

* cited by examiner

Primary Examiner—Louis J. Casaregola
(74) Attorney, Agent, or Firm—Nixon & Vanderhye P.C.

(57) ABSTRACT

A nitrogen compressor in an IGCC (integrated gasification, combined cycle) system provides gaseous nitrogen to be directly injected into the combustor of a gas turbine in the IGCC. The nitrogen is injected at substantially the same pressure as the output pressure from the nitrogen compressor. The compressor is controlled to adjust the output pressure of the nitrogen to match a nitrogen injection pressure for the combustor. By controlling the flow (pressure) of the nitrogen injected to a combustor of a gas turbine at the nitrogen compressor, the compressor is relieved of having to overcome the pressure loss through the nitrogen injection valves (which valves are run at or near full open throughout the operation of the nitrogen injection process), and does not need to provide nitrogen at a pressure substantially greater than the nitrogen pressure injected into the combustor.

6 Claims, 4 Drawing Sheets

APPARATUS FOR CONTROLLING NITROGEN INJECTION INTO GAS TURBINE

FIELD OF THE INVENTION

This invention relates generally to industrial gas turbines used in integrated gasification, combined cycle (IGCC) systems. Specifically, the invention relates to directly injecting nitrogen into the combustor of the gas turbine to reduce total $NO_x$ (nitrous oxides emissions) from the IGCC system.

BACKGROUND OF THE INVENTION

FIG. 1 shows an exemplary IGCC system which includes a gasification system that is integrated with power producing turbine systems. A gasifier 10 converts a mixture of fuel, air or oxygen, steam and optionally limestone into an output of hot fuel gases. These gases are cleaned in a clean-up device 12 and supplied to the combustor 14 of a gas turbine 16. The power output from the gas turbine drives a generator 18 that supplies electrical power to a power grid 20. Hot exhaust from the turbine of the gas turbine is supplied to a heat recovery steam generator 22 which produces steam that drives a steam turbine 24 and flue gases which are exhausted from the IGCC system. Power generated by the steam turbine drives an electrical generator 26 that provides electrical power to the power grid 20. Compressed air from the compressor 28 of the gas turbine is supplied to the gasifier 10. Similarly, steam from the heat recovery steam generator 22 is also provided to the gasifier. Thus, the combined cycle internally generates the steam, compressed air or oxygen and power needed to drive the gasifier 10.

The gasification system may be used in conjunction with fuels such as coal, petroleum coke, residual oil, oil emulsions, tarsands and other similar fuels. This gasification process generates large flows of excess nitrogen association with the production of the oxygen feed for the gasification reaction. A difficulty has been how to best use the excess nitrogen generated from the gasification process. One approach is to return the excess nitrogen to the gas turbine by the injection of nitrogen directly into the combustion section of the gas turbine. Direct injection of nitrogen into the combustion section reduces dramatically the total nitrous oxide emissions from the entire ICGG system.

A difficulty with nitrogen injection is that the excess nitrogen gas generated by the gasifier 10 must be highly compressed to be injected into the combustor of a gas turbine. The nitrogen gas must be compressed to pressure levels at least as great as the levels in the combustion section 14, which is downstream of the compressor 28 of the gas turbine. Substantial power is required to drive the compressor 30 in order to achieve the high levels of nitrogen compression necessary to inject nitrogen into the combustion. The power requirements of the compressor 30 are a relatively high proportion of the total power requirement of the IGCC system.

Compressed nitrogen from the compressor 30 is distributed to the combustion cans of the combustor 14 by a nitrogen injection manifold coupled to the combustor. This nitrogen injection manifold injects nitrogen ($N_2$) into each combustion can of the combustor. The prior art manifolds included nitrogen regulation valves which modulated the flow of nitrogen to the gas turbine combustion cans. The control system 32 for the gas turbine operates the nitrogen flow valves at the manifold to regulate the flow of nitrogen to the combustion section. By adjusting the nitrogen flow valves, the controller 32 regulates the pressure of the nitrogen downstream of the valve flow to the combustor.

The pressure of the nitrogen gas upstream of the flow regulation valve is the supply pressure provided to the flow valves by the nitrogen compressor 30. This supply pressure is relatively constant and must be substantially higher than the pressure of the nitrogen gas supplied to the combustor. The compressor 30 must supply nitrogen gas at a pressure sufficiently high to overcome the pressure loss through the valves and to continually provide the maximum possible nitrogen pressure that would be required for any operating condition of the combustor 14. An additional 10–20 psid (pounds per square inch) above the pressure supplied to the combustor was required to achieve accurate control of the nitrogen flow through the valve. Accordingly, prior nitrogen compressors were driven to provide a continual maximum pressure for the nitrogen gas that is substantially greater than the pressure of the nitrogen when injected into the combustor.

BRIEF SUMMARY OF THE INVENTION

The power required to operate a nitrogen compressor in an IGCC system has been reduced by controlling the pressure of the nitrogen injected to a combustor of a gas turbine at the nitrogen compressor 30. This technique replaces the prior technique of controlling the pressure of the nitrogen being injected into the combustor using nitrogen injection valves at the nitrogen injection manifold of the combustor. The controller 32 for the gas turbine regulates the operation of the compressor 30, such as by adjusting the compressors inlet guide vanes (IGVs), to provide the desired nitrogen gas pressure at the output of the compressor 30. The compressor is relieved of having to overcome the pressure loss through the nitrogen injection valves (which valves are run at or near full open throughout the operation of the nitrogen injection process), and to provide nitrogen at a pressure substantially greater than the nitrogen pressure injected into the combustor.

By using the nitrogen injection compressor to modulate the pressure of nitrogen injected into the combustor, the pressure of the nitrogen output from the compressor can be reduced (as compared to the compressor output required for prior art systems which had to provide nitrogen at a pressure sufficiently above that supplied to the combustor to compensate for the pressure loss through the nitrogen gas control valves and the additional higher pressure required to provide accurate control of nitrogen flow through the valve). This reduction in pressure output by the nitrogen compressor allows for substantially lower power consumption by the nitrogen compressor. This lower power consumption substantially reduces the power costs for IGCC systems.

BRIEF DESCRIPTION OF THE DRAWINGS

The invention, its structure and function, and method of making and using the invention will be better understood from the detailed description of the preferred embodiment of the invention with reference to the drawings, which are as follows.

DETAILED DESCRIPTION OF A PREFERRED EMBODIMENT OF THE INVENTION

Figure 1:
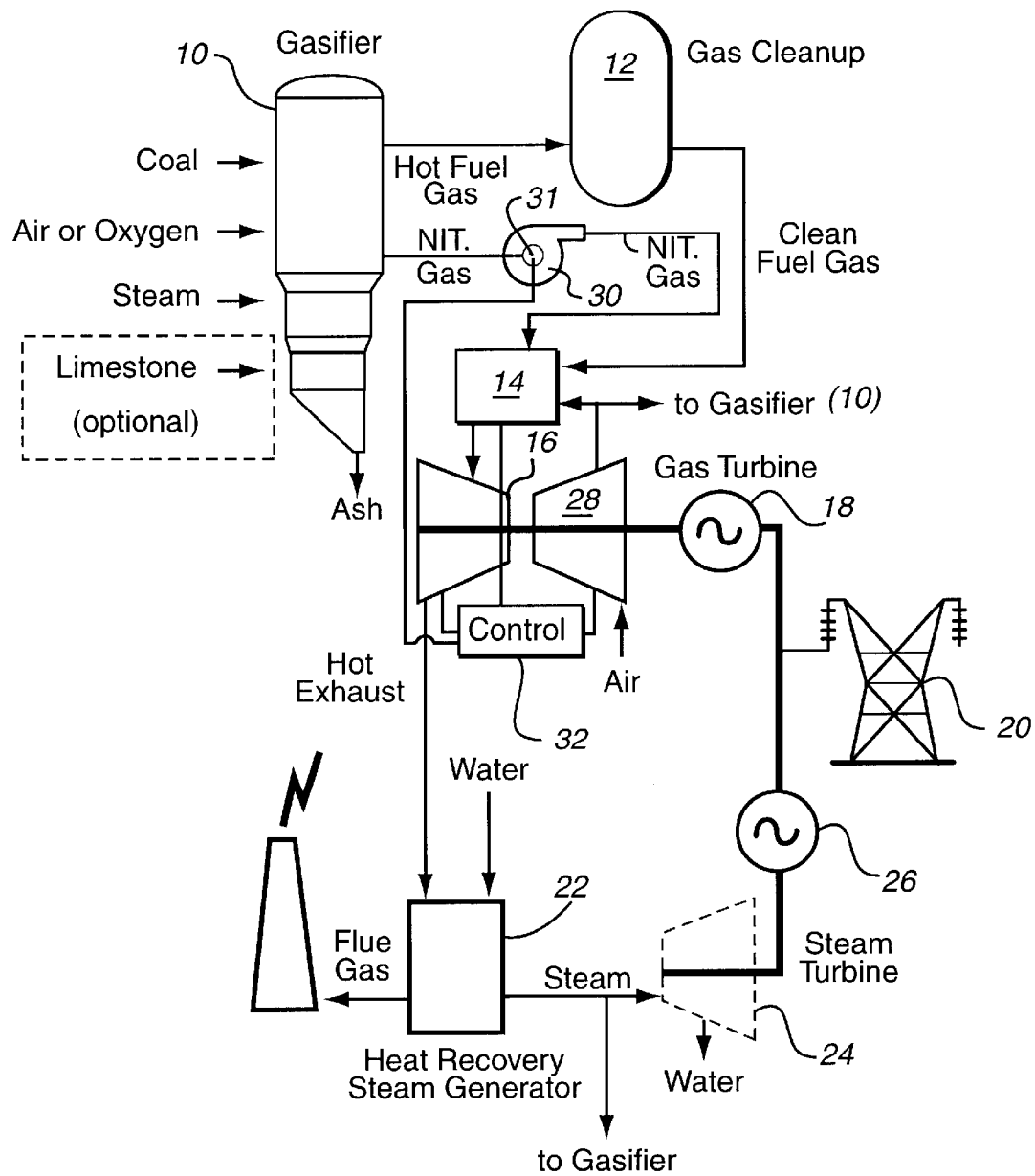
FIG. 1 is a schematic diagram of an IGCC plant.
Figure 2:
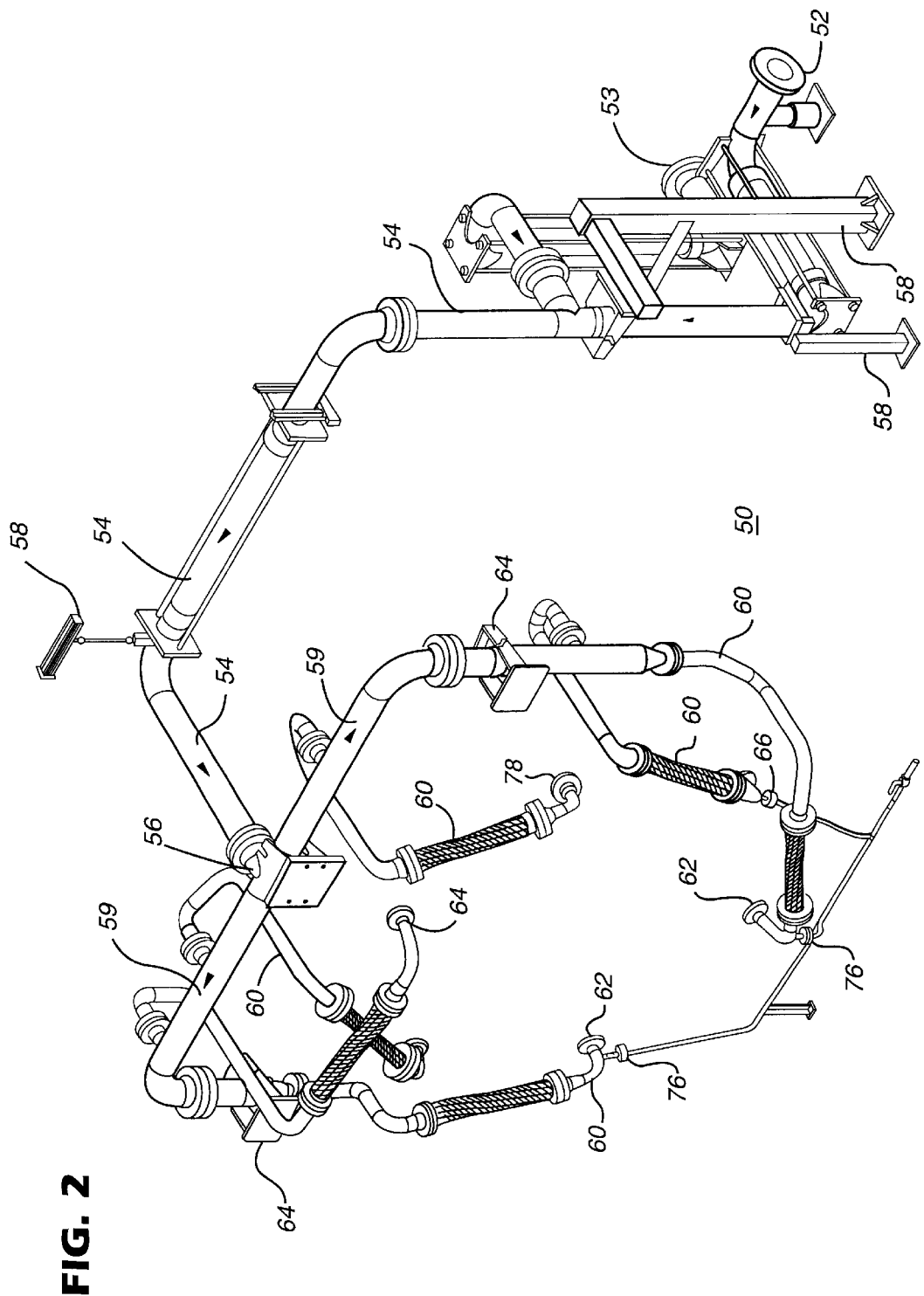
FIG. 2 is a perspective view of a nitrogen injection manifold for a gas turbine.

FIG. 2 shows a nitrogen injection manifold 50. The manifold includes a nitrogen gas inlet port 52 that is coupled through piping to an output of a nitrogen compressor 30. A steam port 53 may also be included so that steam may be injected with nitrogen into the combustion section. The manifold includes a series of nitrogen gas pipes 54 that provide a conduit for nitrogen gas from the inlet 52 to a distribution manifold coupling 56. The manifold may be mounted to the floor and ceiling of the facility housing the gas turbine using mounting brackets 58. The distribution coupling 56 couples the nitrogen gas to a nitrogen combustor distribution manifold 59 that distributes the nitrogen gas to each of the combustor cans of the combustor. For each combustor can, a flexible gas coupling 60 is provided between the distribution manifold 59 and the outlet port 62 coupled to the combustion can. The distribution manifold 59 is directly mounted to the housing of the gas turbine via mounting brackets 64.

Figure 3:
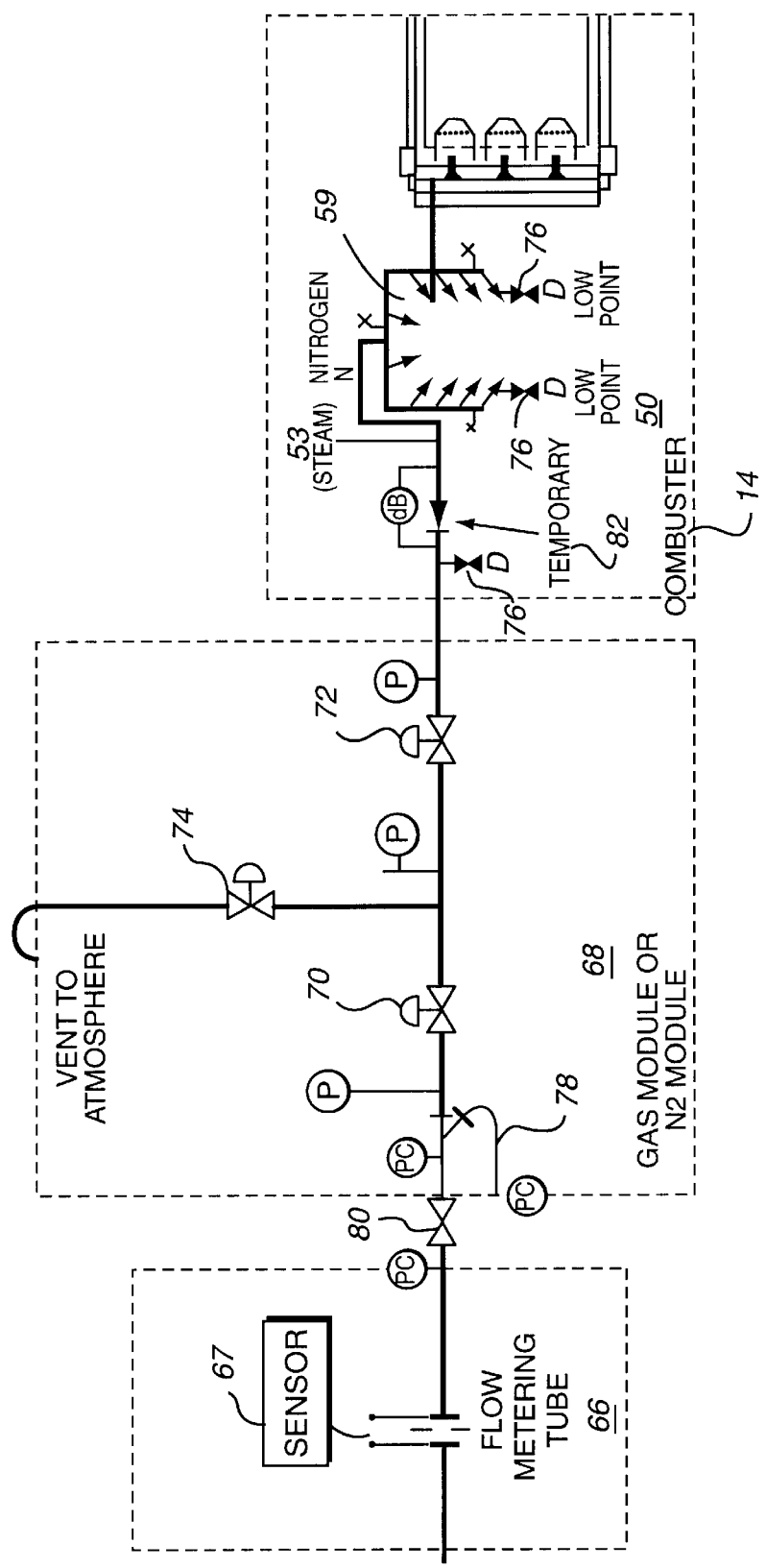
FIG. 3 is a schematic diagram of a nitrogen injection system.

FIG. 3 is a schematic diagram of an exemplary nitrogen injection system having a flow metering tube 66, a nitrogen gas module 68, and the nitrogen injection manifold 50. The flow metering tube 66 is used to sense the nitrogen gas flow being supplied from the output of the nitrogen compressor 30. The flow sensed by the metering tube is provided via sensor 67 to the controller for operating the nitrogen compressor and regulating the nitrogen pressure and/or flow injected to the combustion section. The gas module 68 includes a turn-off valve 70 and a metering valve 72 that are used to control the flow of nitrogen gas to the combustion section. The turn-off valve 70 is used to isolate the combustion section while nitrogen is not being injected. The metering valve 72 is maintained in a fully open position while the nitrogen gas pressure/flow is controlled through the compressor output pressure. In addition, a nitrogen vent 74 to atmosphere is provided to relieve pressure from the nitrogen injection system. The injection system 50 includes drains 76 (see also FIG. 2) for removing liquids that may have collected in the nitrogen manifold. The injection system 50 includes an array of nozzles 78 that are coupled to the combustion cans of the combustion section of the gas turbine.

At the lowermost portions of the nitrogen couplings to the combustor are water drain lines 76. These drain lines are normally closed. However, they are open when the gas turbine is turned off and are open to clear any liquids from the nitrogen manifold.

The nitrogen manifold 50 includes an orifice or venturi metering tube with flow (or pressure) instrumentation 66 which provides an output flow signal to the controller of the nitrogen gas flow being supplied through the manifold. In addition, the nitrogen manifold may include a Y-type or basket-type strainer 78 to capture any sediment in the nitrogen flow. A gas turbine controlled stop valve and control valve may also be coupled to the manifold An inter-valve vent 80 may also be further coupled to the manifold. Further, a temporary "witches hat strainer" 82 may also be coupled to the manifold. These components are conventional components for nitrogen injection systems.

Figure 4:
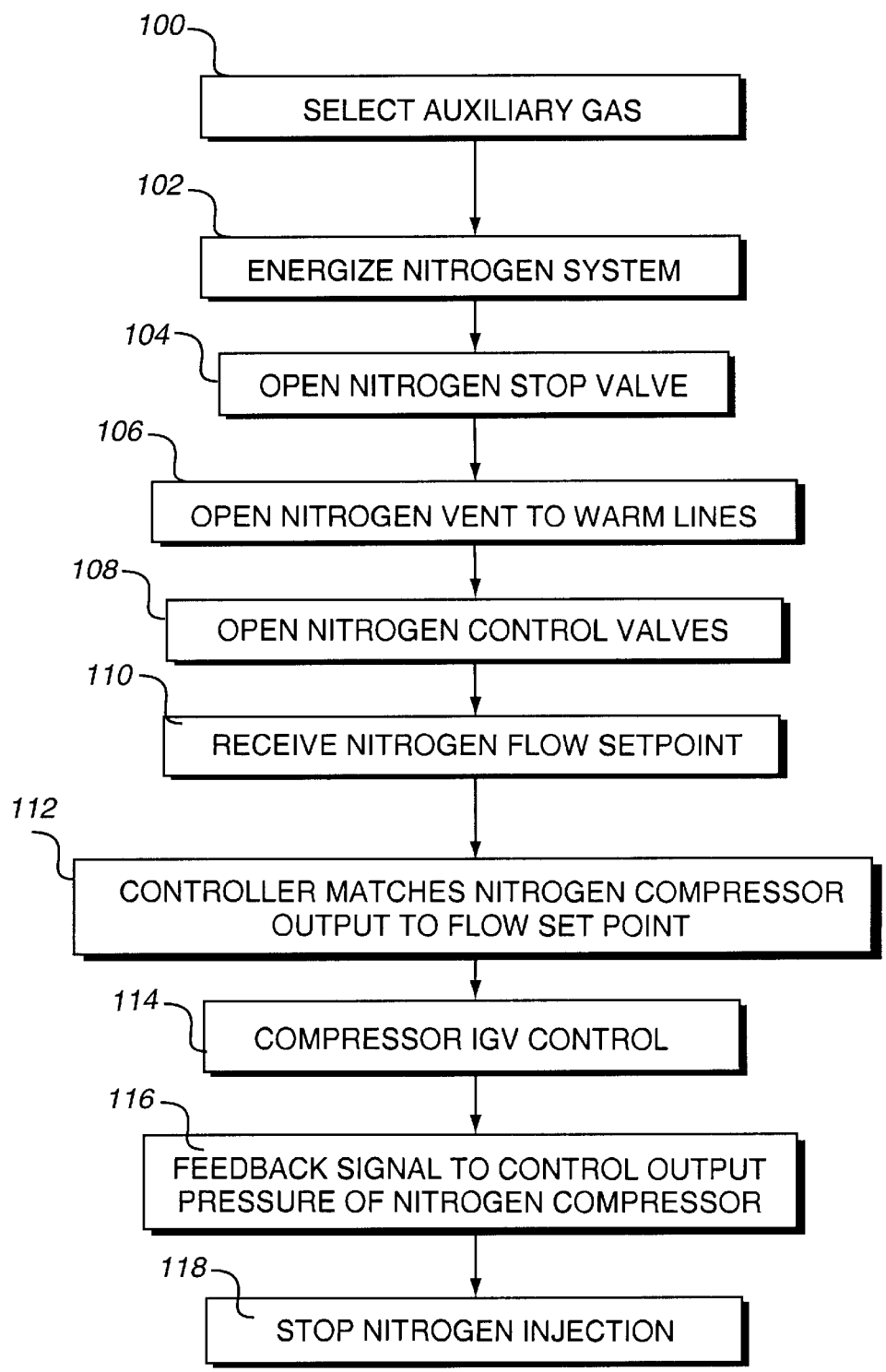
FIG. 4 is a flow chart showing the control steps for the nitrogen injection system.

FIG. 4 is a flow diagram that shows the operation steps of controlling the nitrogen compressor. When the gas turbine is switched to auxiliary gas (step 100), the nitrogen injection system is energized by the controller 32 for the gas turbine in step 102. The controller actuates the gas turbine controlled nitrogen stop valve coupled to the manifold to open the gas passage to the manifold in step 104. In addition, the controller opens the nitrogen inter-valve vent for the nitrogen manifold to allow a small flow of nitrogen and thereby warm the nitrogen lines for approximately one minute, in step 106. Similarly, the control system subsequently opens the nitrogen control valves to a minimum warm-up valve position for approximately 30 minutes in step 108. At this point, the nitrogen manifold and control valves have been activated and sufficiently warmed to begin modulating the flow of nitrogen in conjunction with the nitrogen compressor controls.

The gas turbine controller 32 determines a nitrogen flow rate setpoint based on the flow of auxiliary gas (from the gasifier) to the combustor of the gas turbine. This flow setpoint is applied to control the output pressure of the nitrogen compressor 30, which includes a controller. The nitrogen compressor controller receives the flow setpoint from the gas turbine controller, in step 110. The controller for the compressor then operates the compressor to generate a nitrogen output pressure which matches the flow setpoint in step 112. Simultaneously, the controller 32 for the gas turbine applies a slight multiplier, e.g., 1.02, to the flow setpoint and uses this multiplied flow setpoint as an internal flow control to operate the control valve for the nitrogen manifold. By instructing the control valve to operate at a flow rate slightly above the pressure of the nitrogen supplied by the compressor, the control valve is maintained in a full open position so as to minimize the pressure loss through the control valve.

The compressor controller matches the flow setpoint by adjusting inlet guide vanes (IGVs) on the nitrogen compressor, in step 114. By adjusting the IGVs (31), the controller for the compressor regulates the compressor output pressure such that the nitrogen pressure being supplied to the nitrogen manifold matches the nitrogen pressure to be delivered to the combustor. Thus, the nitrogen compressor is being used to control the nitrogen pressure to the combustor. The compressor is not being required to generate nitrogen at a pressure substantially higher than that needed for the combustor, as was done in prior systems.

A feedback control system is provided by the controller for the compressor. The compressor controller senses the nitrogen gas output flow from the compressor and compares the sensed nitrogen flow to the nitrogen flow reference signal (setpoint) provided by the gas turbine controller. If the compressor output flow differs from the flow setpoint, the nitrogen compressor controller adjusts the inlet guide vanes to eliminate the difference, in step 116. Thus, the nitrogen gas output pressure is maintained at the flow setpoint by use of feedback. In addition, the nitrogen compressor controller will turn off, i.e., "trip", the nitrogen injection system when it detects that the gas turbine control system has shut the nitrogen injection system down or some other trip event has occurred in step 118.

The total power consumed by the nitrogen compressor 30 is reduced from prior systems, due to the direct control of the compressor for regulating the nitrogen gas pressure applied to the combustor. The present system avoids having to supply artificially high nitrogen gas pressures which are needed when nitrogen gas pressures are regulated by a control valve, and also minimizes pressure loss through partially-open control valves. In the present system, control valves are not used to regulate the pressure of the nitrogen gas to the combustor, and the control valves (to the extent they remain in the system) are held in a fully open position to minimize the pressure loss through those control valves.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nitrogen supply system in an integrated gasification, combined cycle system (IGCC) having a gas turbine including a combustion section, and a gasification system providing gasified fuel to the combustion section of the gas turbine, the nitrogen supply system comprising:

a nitrogen compressor having an input coupled to a nitrogen gas output of the gasification system and an output coupled to a nitrogen injection system, wherein said compressor supplies nitrogen at a predetermined output pressure from the output, and said nitrogen injection system connected to the combustion section to inject compressed nitrogen gas into the combustion section at substantially the same pressure as the output, wherein the predetermined output pressure is a predetermined desired nitrogen input pressure to the combustion section.

2. A nitrogen supply system as in claim 1 further comprising a controller regulating an output nitrogen flow from the nitrogen compressor.

3. A nitrogen supply system as in claim 2 wherein the controller further regulates inlet guide vanes of the nitrogen compressor.

4. A nitrogen supply system as in claim 2 wherein the controller regulates the output nitrogen flow from the nitrogen compressor to match a predetermined nitrogen flow setpoint.

5. A nitrogen supply system in an integrated gasification, combined cycle system (IGCC) having a gas turbine including combustion section and a gasification system providing gasified fuel to the combustion section of the gas turbine, the nitrogen supply system comprising:

a nitrogen gas compressor having an input coupled to a nitrogen gas output of the gasification system and a nitrogen gas compressor output coupled to a nitrogen injection manifold, wherein said compressor output supplies nitrogen at an output pressure;

said nitrogen injection manifold having at least one coupling to the combustion section of the gas turbine to inject compressed nitrogen gas into the combustion section at substantially the same pressure as the output pressure at the nitrogen compressor output, and a controller operating said nitrogen compressor to regulate the output pressure of nitrogen flow through the nitrogen gas compressor, wherein the controller regulates the compressor output pressure to match a predetermined nitrogen flow setpoint.

6. A nitrogen supply system as in claim 7 further comprising a nitrogen control valve in a nitrogen conduit coupled to the nitrogen injection system, wherein said valve is turned to a fully open position while the controller operates the nitrogen compressor.

* * * * *

UNITED STATES PATENT AND TRADEMARK OFFICE
CERTIFICATE OF CORRECTION

PATENT NO.     : 6,513,317 B2
DATED          : February 4, 2003
INVENTOR(S)    : Arar et al Page 1 of 1

It is certified that error appears in the above-identified patent and that said Letters Patent is hereby corrected as shown below:

<u>Column 6,</u>
Line 24, kindly delete "claim 7" and insert -- claim 5 -- therefor.

Signed and Sealed this

Thirteenth Day of May, 2003

JAMES E. ROGAN
*Director of the United States Patent and Trademark Office*